(12) United States Patent
Evangelista et al.

(10) Patent No.: US 9,956,636 B2
(45) Date of Patent: May 1, 2018

(54) WELDED BLANK ASSEMBLY AND METHOD (71) Applicant: Shiloh Industries, Inc., Valley City, OH (US)

(72) Inventors: James J. Evangelista, Northville, MI (US); Michael Telenko, Canton, MI (US); Jason E. Harfoot, Walled Lake, MI (US); Jack A. Atkinson, Brunswick, OH (US); James W. Walther, Litchfield, OH (US); Anthony M. Parente, Valley City, OH (US)

(73) Assignee: SHILOH INDUSTRIES, INC., Valley City, OH (US)

( * ) Notice: Subject to any disclaimer, the term of this patent is extended or adjusted under 35 U.S.C. 154(b) by 517 days.

(21) Appl. No.: 14/211,924

(22) Filed: Mar. 14, 2014

(65) Prior Publication Data

US 2014/0270922 A1    Sep. 18, 2014

Related U.S. Application Data (60) Provisional application No. 61/784,184, filed on Mar. 14, 2013.

(51) Int. Cl.
*B23K 26/00* (2014.01)
*B23K 9/02* (2006.01)
(Continued)

(52) U.S. Cl.
CPC .......... *B23K 9/0026* (2013.01); *B23K 1/0008* (2013.01); *B23K 26/0006* (2013.01);
(Continued)

(58) Field of Classification Search
CPC .............. B23K 1/0008; B23K 2201/34; B23K 2203/16; B23K 26/0006; B23K 26/322;
(Continued)

(56) References Cited

U.S. PATENT DOCUMENTS 2,177,868 A    10/1939 Chapman
3,464,802 A    9/1969 Meyer
(Continued)

FOREIGN PATENT DOCUMENTS

CN    1633333 A    6/2005
CN    101128278 A    2/2008
(Continued)

OTHER PUBLICATIONS

Reinhold Braun, Nd:YAG Laser Butt Welding of AA6013 Using Silicon and Magnesium Containing Filler Powders, A 426, Materials Science and Engineering, Jun. 25, 2006.
(Continued)

*Primary Examiner* — Sang Y Paik (74) *Attorney, Agent, or Firm* — Reising Ethington, P.C.

(57) ABSTRACT

A welded blank assembly includes a capping material in a weld region of the assembly. The capping material can help protect a weld joint joining first and second sheet metal pieces together. At least one of the sheet metal pieces has a coating material layer that is removed prior to forming the weld joint so that the coating material does not contaminate the weld joint. The removed coating material can be collected before the weld joint is formed and reapplied as part of the capping material after the weld joint is formed, effectively changing the coating material from a potential weld contaminant to a weld joint protectant. The capping material may also include additional material from a source other than the coating material layer.

24 Claims, 7 Drawing Sheets (51) Int. Cl.

| | | |
|---|---|---|
| *B23K 9/00* | (2006.01) | |
| *B23K 1/00* | (2006.01) | |
| *B23K 26/60* | (2014.01) | |
| *B23K 33/00* | (2006.01) | |
| *B23K 26/361* | (2014.01) | |
| *B23K 101/34* | (2006.01) | |
| *B23K 103/16* | (2006.01) | |
| *B23K 103/08* | (2006.01) | |

(52) U.S. Cl.
CPC ............ *B23K 26/361* (2015.10); *B23K 26/60* (2015.10); *B23K 33/004* (2013.01); *B23K 2201/34* (2013.01); *B23K 2203/08* (2013.01); *B23K 2203/16* (2013.01); *B23K 2203/172* (2015.10); *Y10T 403/477* (2015.01)

(58) Field of Classification Search
CPC .... B23K 26/362; B23K 26/60; B23K 9/0026; Y10T 403/477
USPC .... 219/101–107, 136, 137 R, 121.6–121.86; 428/615; 403/270–272
See application file for complete search history.

(56) References Cited

U.S. PATENT DOCUMENTS

| | | | | |
|---|---|---|---|---|
| 3,615,902 | A | * | 10/1971 | Lesney ................ C21D 8/0268 148/530 |
| 3,733,681 | A | | 5/1973 | Schlein |
| 4,037,073 | A | | 7/1977 | Becker |
| 4,073,427 | A | | 2/1978 | Keifert et al. |
| 4,401,727 | A | | 8/1983 | Berke et al. |
| 4,459,062 | A | | 7/1984 | Siebert |
| 4,474,861 | A | | 10/1984 | Ecer |
| 4,485,960 | A | * | 12/1984 | Sagan ...................... B23K 9/23 228/107 |
| 4,634,832 | A | * | 1/1987 | Martyr ............... B23K 26/0643 219/121.63 |
| 4,642,446 | A | | 2/1987 | Pennington |
| 4,688,691 | A | | 8/1987 | Christian |
| 4,725,507 | A | | 2/1988 | Lescaut |
| 4,758,703 | A | | 7/1988 | Drever |
| 4,818,629 | A | | 4/1989 | Jenstrom et al. |
| 4,970,600 | A | | 11/1990 | Garnier |
| 5,127,570 | A | * | 7/1992 | Steitz ................. B23K 26/0661 174/254 |
| 5,268,556 | A | | 12/1993 | Coyle, Jr. |
| 5,305,946 | A | | 4/1994 | Heilmann |
| 5,662,762 | A | * | 9/1997 | Ranalli ................. B08B 7/0042 156/707 |
| 5,952,109 | A | | 9/1999 | Nagami |
| 6,042,659 | A | | 3/2000 | Brown |
| 6,296,170 | B1 | | 10/2001 | Hardwick |
| 6,296,805 | B1 | | 10/2001 | Laurent et al. |
| 6,313,434 | B1 | | 11/2001 | Patterson |
| 6,407,363 | B2 | | 6/2002 | Dunsky |
| 6,564,604 | B2 | | 5/2003 | Kefferstein et al. |
| 6,572,984 | B2 | | 6/2003 | Brink |
| 6,621,040 | B1 | | 9/2003 | Perry |
| 6,674,472 | B1 | | 1/2004 | Tsutsui |
| 6,797,914 | B2 | * | 9/2004 | Speranza ............. B23K 26/244 219/121.64 |
| 6,800,150 | B2 | | 10/2004 | Totino et al. |
| 7,020,023 | B2 | | 3/2006 | Kuramori |
| 7,531,283 | B2 | | 5/2009 | Darcy, III et al. |
| 7,748,598 | B2 | | 7/2010 | Want |
| 7,971,303 | B2 | | 7/2011 | Prasad et al. |
| 8,319,148 | B2 | | 11/2012 | Nowak |
| 8,614,008 | B2 | | 12/2013 | Canourgues |
| 8,642,134 | B2 | | 2/2014 | Nagai |
| 2001/0016268 | A1 | | 8/2001 | Maki |
| 2001/0042393 | A1 | | 11/2001 | Kefferstein |
| 2001/0054638 | A1 | | 12/2001 | Hardwick |
| 2002/0148880 | A1 | | 10/2002 | Brink |
| 2003/0006221 | A1 | | 1/2003 | Hong |
| 2003/0201037 | A1 | | 10/2003 | Totino et al. |
| 2004/0074882 | A1 | | 4/2004 | Speranza |
| 2004/0247932 | A1 | | 12/2004 | Kagohara |
| 2005/0136184 | A1 | | 6/2005 | Voges |
| 2005/0211687 | A1 | | 9/2005 | Sonoda et al. |
| 2007/0034614 | A1 | | 2/2007 | McClain |
| 2008/0011720 | A1 | | 1/2008 | Briand |
| 2008/0083715 | A1 | * | 4/2008 | Kirmeier .............. B23K 26/009 219/121.69 |
| 2008/0145688 | A1 | | 6/2008 | Miller et al. |
| 2008/0092312 | A1 | | 9/2008 | Prasad et al. |
| 2008/0257871 | A1 | | 10/2008 | Leiser |
| 2008/0268279 | A1 | * | 10/2008 | Want ......................... B01J 3/04 428/615 |
| 2009/0220815 | A1 | * | 9/2009 | Canourgues ............ B23K 9/23 428/583 |
| 2009/0253809 | A1 | | 10/2009 | Gomurashvili et al. |
| 2010/0139691 | A1 | | 6/2010 | Silberberg et al. |
| 2010/0139864 | A1 | | 6/2010 | Silberberg et al. |
| 2011/0226746 | A1 | | 9/2011 | Briand |
| 2012/0074106 | A1 | | 3/2012 | Canourgues |
| 2012/0145686 | A1 | | 6/2012 | Alpay |
| 2012/0205355 | A1 | | 8/2012 | Münzer |
| 2013/0236239 | A1 | | 9/2013 | Brandt |
| 2014/0057128 | A1 | | 2/2014 | Canourgues |

FOREIGN PATENT DOCUMENTS

| | | |
|---|---|---|
| CN | 101204866 A | 6/2008 |
| CN | 101426612 | 5/2009 |
| CN | 101628355 | 1/2010 |
| CN | 101663717 | 3/2010 |
| DE | 2122926 A1 | 11/1972 |
| DE | 102010019258 | 11/2011 |
| EP | 0971044 | 1/2000 |
| EP | 1143029 | 10/2001 |
| EP | 1878531 | 1/2008 |
| FR | 2827874 | 1/2003 |
| JP | S61159292 A | 7/1986 |
| JP | S62263882 A | 11/1987 |
| JP | H03258484 A | 11/1991 |
| JP | H04237570 A | 8/1992 |
| JP | H06198471 A | 7/1994 |
| JP | H0741841 A | 2/1995 |
| JP | 07096380 | 4/1995 |
| JP | 07293749 A | 11/1995 |
| JP | H09501105 A | 2/1997 |
| JP | 9314337 A | 12/1997 |
| JP | H10168545 A | 6/1998 |
| JP | H10176287 A | 6/1998 |
| JP | 11239872 A | 9/1999 |
| JP | 2001252781 A | 9/2001 |
| JP | 2002256407 A | 9/2002 |
| JP | 2003183802 A | 7/2003 |
| JP | 2004223543 A | 8/2004 |
| JP | 2004344919 A | 12/2004 |
| JP | 4200872 | 5/2005 |
| JP | 2007049164 A | 2/2007 |
| JP | 2007154257 A | 6/2007 |
| JP | 2007237216 A | 9/2007 |
| JP | 2009534529 A | 9/2009 |
| JP | 2009226475 A | 10/2009 |
| JP | 2010052161 A | 3/2010 |
| JP | 2011041982 A | 3/2011 |
| KR | 10198980056004 A | 9/1998 |
| KR | 2004-0058615 A | 7/2004 |
| KR | 20050103379 A | 10/2005 |
| KR | 1020090005004 A | 1/2009 |
| KR | 20100120584 A | 11/2010 |
| WO | WO2009092760 A1 | 7/2009 |
| WO | WO2011020490 A1 | 2/2011 |

OTHER PUBLICATIONS

Vierstraete; Ehling; Pic; Yin, Laser Ablation for Hardening Laser Welded Steel Blanks, Industrial Laser Solutions, Mar. 2010, pp. 6-11.

(56) References Cited

OTHER PUBLICATIONS

Tilmann Schmidt-Sandte, Laserstrahlbasierte Entgratverfahren fur Feinwerktechnische Anwendungen, 2003, Fig 3.8 p. 27 and point 2 p. 32.
Chinese Office Action for Application No. 201380027064.4 dated Sep. 30, 2015, 6 pages.
Korean Office Action for Application No. 10-2015-7002541 dated Dec. 3, 2015, 6 pages.
English Translation of Korean Office Action for Application No. 10-2015-7002541 dated Dec. 3, 2015, 6 pages.
Korean Office Action for Application No. 10-2014-7035822 dated Dec. 3, 2015, 5 pages.
English Translation of Korean Office Action for Application No. 10-2014-7035822 dated Dec. 3, 2015, 6 pages.
Japanese Office Action for Application No. 2015514241 dated Mar. 22, 2016, 5 pages.
English Translation of Japanese Office Action for Application No. 2015514241 dated Mar. 22, 2016, 6 pages.
Chinese Office Action for Application No. 201380062551.4 dated Apr. 5, 2016, 11 pages.
Japanese Office Action for Application No. 2015520582 dated Mar. 29, 2016, 7 pages.
English Translation of Japanese Office Action for Application No. 2015520582 dated Mar. 29, 2016, 9 pages.
Chinese Office Action for Application No. 201380034771.6 dated May 18, 2016, 10 pages.
International Search Report for PCT/US2014/029043 dated Aug. 26, 2014, 4 pages.
Japanese Office Action for Application No. 2016502969 dated Nov. 15, 2016, 5 pages.
English Translation of Japanese Office Action for Application No. 2016502969 dated Nov. 15, 2016, 5 pages.
Chinese Office Action for Application No. 201480015277.X dated Nov. 4, 2016, 8 pages.
Korean Office Action for Application No. 1020157002541 dated Jul. 26, 2016, 13 Pages.
English Translation of Korean Office Action for Application No. 1020157002541 dated Jul. 26, 2016, 9 Pages.
European Search Report for Application No. PCT/US2014029043 dated Mar. 30, 2017, 6 pages.
Extended European Search Report for Application No. 13808670.7 dated Jun. 15, 2016, 11 pages.
Extended European Search Report for Application No. 13859144.1 dated Aug. 4, 2016, 5 pages.
Third Chinese Office Action for Application No. 201480015277.X dated Feb. 1, 2018, 9 pages.

* cited by examiner

WELDED BLANK ASSEMBLY AND METHOD

REFERENCE TO RELATED APPLICATIONS

This application claims the benefit of U.S. Provisional Ser. No. 61/784,184 filed on Mar. 14, 2013, the entire contents of which are incorporated herein by reference.

TECHNICAL FIELD

The present disclosure generally relates to welded blank assemblies and, more particularly, to welding coated sheet metal pieces together to form welded blank assemblies.

BACKGROUND

In an effort to improve resistance to corrosion, scaling and/or other processes, sheet metal made of high-strength or hardenable steel alloys are now being made with one or more thin coating material layers, such as aluminum- and zinc-based layers. Although these coating material layers can impart desirable qualities to the sheet metal, their presence can contaminate welds, thereby reducing weld strength, integrity, etc. This is particularly true if the coated sheet metal piece is being butt welded or lap welded to another sheet metal piece.

SUMMARY

According to one aspect, there is provided a welded blank assembly. The welded blank assembly comprises: first and second sheet metal pieces, at least one of the sheet metal pieces has a base material layer, a coating material layer, and an edge region with a weld notch where at least a portion of the coating material layer has been removed; a weld joint joining the first and second sheet metal pieces together at the edge region, the weld joint includes material from the base material layer but is substantially free of material from the coating material layer; and capping material that fills at least a portion of the weld notch. The capping material is in direct contact with the weld joint and becomes a permanent addition to the welded blank assembly.

According to another aspect, there is provided a welded blank assembly. The welded blank assembly comprises: first and second sheet metal pieces joined together, where at least one of the sheet metal pieces has a base material layer and a coating material layer; a weld joint that joins the first and second sheet metal pieces together along a weld region, the weld joint includes material from the base material layer but is substantially free of material from the coating material layer; and capping material that overlays at least a portion of the weld joint. The capping material includes material that was removed from the coating material layer before the weld joint was formed and was reapplied over the weld joint after the weld joint was formed.

According to another aspect, there is provided a method of making a welded blank assembly. The method may comprise the steps of: removing coating material from a region of a coated sheet metal piece; welding the sheet metal piece to another sheet metal piece so that a weld joint is formed in the region of the coated sheet metal piece, the weld joint includes base material from the sheet metal pieces but is substantially free of coating material; and applying capping material to the region of the coated sheet metal piece so that it covers at least a portion of the weld joint.

DRAWINGS

Preferred exemplary embodiments will hereinafter be described in conjunction with the appended drawings, wherein like designations denote like elements, and wherein.

DETAILED DESCRIPTION

The welded blank assemblies disclosed herein are formed from sheet metal pieces, one or more of which have a weld notch formed along an edge region at an edge to be welded. The weld notch is characterized by the absence of certain constituents from the material layers. These sheet metal pieces, with material removed from the thin material layers along the edge region, can be used to form a welded blank assembly with a weld joint that is substantially free from one or more of the coating layer constituents. Material removed from the sheet metal pieces may be subsequently captured and reapplied or disposed over the weld joint so that it acts as a protectant rather than a contaminant.

Figure 1A:
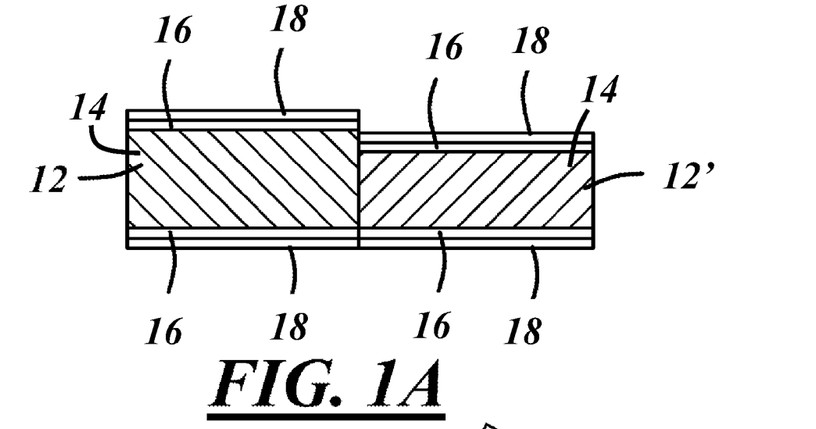
FIGS. 1A-C are cross-sectional views of a conventional weld joint where sheet metal pieces are joined without weld notches formed therein.
Figure 1B:
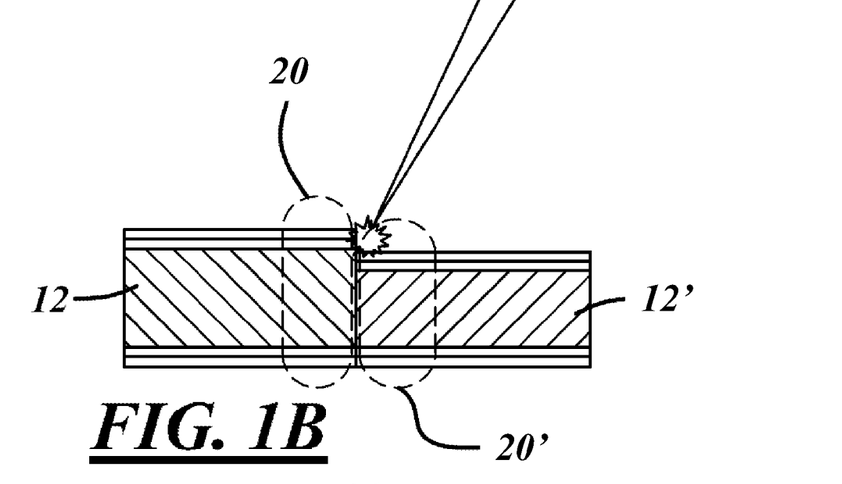
Figure 1C:
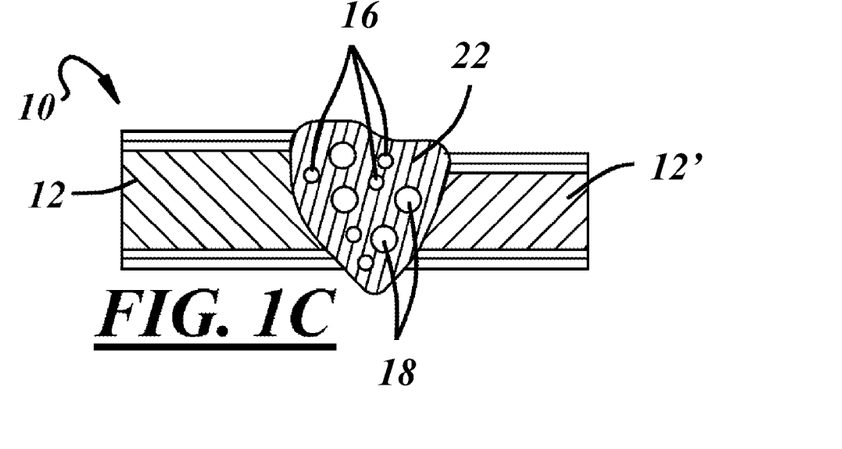

Turning first to FIGS. 1A-C, there are shown some of the steps involved with manufacturing a conventional tailor-welded blank 10 that includes thick and thin sheet metal pieces 12, 12' laser welded together in an edge-to-edge fashion. According to this example, each of the sheet metal pieces 12, 12' has a base material layer 14 and multiple thin material layers 16, 18 covering opposite surfaces of the base material layer. As is appreciated by those skilled in the art, there are numerous material layers that could be found on sheet metal stock, including various types of surface treatments, coating material layers such as aluminum-based and zinc-based material layers, oils and other oxidation preventing substances, contaminants from the manufacturing or material handling processes, and oxidation layers, to name but a few. Once the two sheet metal pieces are brought together in abutment, a laser beam or other welding tool is used to melt some of the sheet metal located in edge regions 20, 20' so that a certain amount of the thin material layers 16, 18 becomes embedded within the resulting weld joint 22. Unless first removed, these unwanted constituents could have a negative impact on the overall strength and quality of the weld joint.

Figure 2:
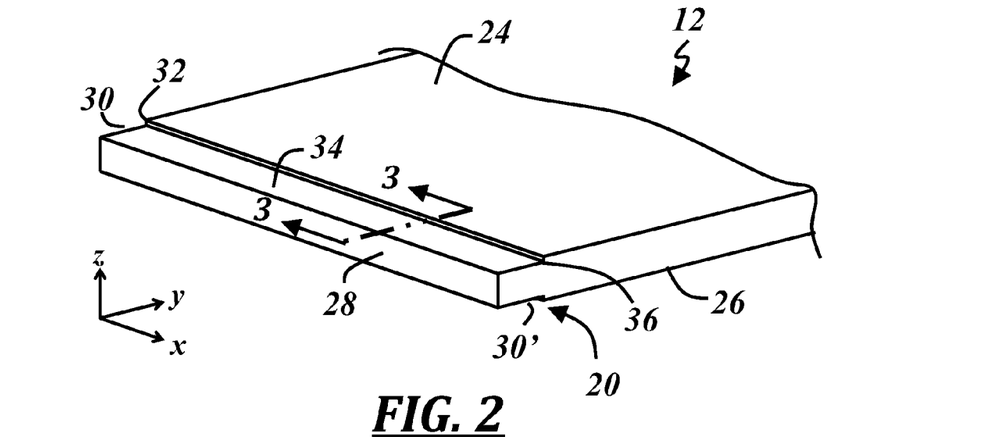
FIG. 2 is a perspective view of an edge region of an exemplary sheet metal piece, including weld notches on opposite sides of the sheet metal piece.

Referring to FIG. 2, there is shown an exemplary sheet metal piece 12 that may be formed and/or utilized by the present method and welded to an adjacent piece along an edge region 20. The sheet metal piece 12 includes opposite first and second sides 24, 26, and the edge region 20 is located along an edge 28 that is to be welded. The particular edge region 20 shown in FIG. 2 includes two weld notches 30, 30'. The two weld notches extend along the edge region 20 on opposite sides 24, 26 of the sheet metal piece 12. Each weld notch 30, 30' is defined by a first notch surface 32 and a second notch surface 34 that intersect or join each other. Though shown with generally perpendicular first and second notch surfaces 32, 34 along a single, straight edge region 20, the weld notches may be configured in numerous ways. For example, a weld notch can: include one or more off-axis or offset notch surfaces, have a uniform or non-uniform depth and/or width, differ from other weld notches located on the same sheet metal piece in terms of size, shape, configuration, etc., or be part of an edge region located along a straight edge, a curved edge, multiple straight or curved edges, or some other part of the sheet metal piece, to cite several possibilities.

Figure 3:
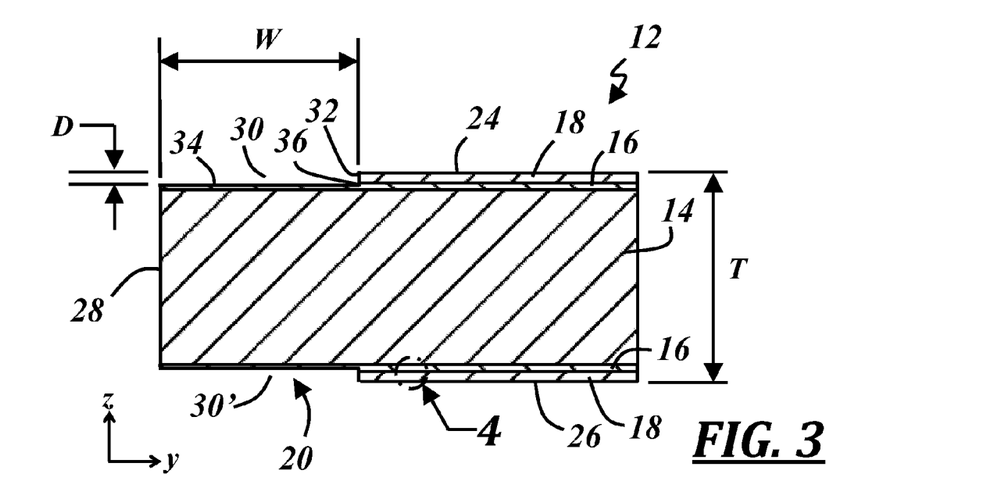
FIG. 3 is an enlarged cross-sectional view of the sheet metal piece of FIG. 2.

FIG. 3 is a cross-section of the edge region 20 of the sheet metal piece 12 that is shown in FIG. 2. The illustrated sheet metal piece 12 includes multiple material layers, including the base material layer 14, intermediate material layers 16, and coating material layers 18. In this embodiment, the base material layer 14 is the central or core material layer (e.g., a steel core) and is sandwiched between the intermediate material layers 16 and the coating material layers 18. The base material layer 14 makes up the majority of the thickness T of the sheet metal piece 12 and thus may contribute significantly to the mechanical properties of the sheet metal piece. The coating material layers 18 are located over opposite surfaces of the base material layer 14 and are the outermost layers of the sheet metal piece 12. Each coating material layer 18 is relatively thin with respect to the base material layer 14 and may be selected to enhance one or more characteristics of the sheet metal piece (e.g., corrosion resistance, hardness, weight, formability, appearance, etc.). The coating material layer 18 may also be selected for use or compatibility with subsequent processes, such as heat treatment or inter-diffusion processes, for example.

Figure 4:
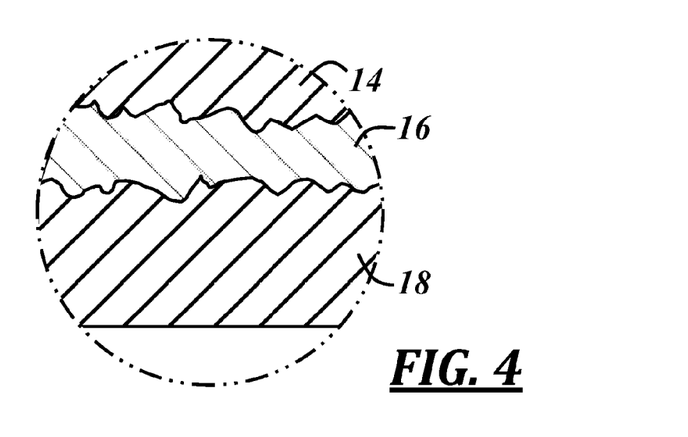
FIG. 4 is an enlarged portion of the cross-sectional view of the sheet metal piece of FIG. 3 showing some of the thin material layers.

Each intermediate material layer 16 is located between the base layer 14 and one of the coating layers 18, and each is in contact with the base and coating layers in this embodiment. The intermediate material layer 16 includes at least one constituent in common with each of the immediately adjacent layers 14, 18, such as an atomic element or chemical compound. The intermediate material layer 16 may be a reaction product of the base and coating material layers 14, 18. For example, a dip coating process, in which the base material layer is immersed or passed through a molten bath of the coating material, can result in a chemical reaction at the interface of the base material layer and the molten bath, and the reaction product is the intermediate material layer 16. In one specific example of such a dip coating process, the base material layer 14 is steel and the coating material layer 18 is an aluminum alloy. The molten bath of aluminum alloy reacts with the base material layer at a base material layer surface to form the intermediate material layer 16, which includes iron-aluminum ($Fe_xAl_y$) intermetallic compounds such as $Fe_2Al_5$. The intermediate material layer 16 can have a higher content of the base material layer constituent (e.g., iron) in areas closer to the base material layer 14, and a higher content of the coating material layer constituent (e.g., aluminum) in areas closer to the coating material layer 18. Though shown in FIG. 3 as a perfectly planar layer with a constant thickness, the intermediate material layer 16 may be irregular along its opposite surfaces as depicted in the enlarged view of FIG. 4. The sheet metal piece 12 may include other, additional material layers as well, and is not limited to the particular arrangement described here.

One specific example of a multi-layered sheet metal piece that is useful for forming parts in the automotive and other industries is a coated steel product, such as that shown in FIG. 3. In one particular embodiment, the base material layer 14 is a high-strength or hardenable steel alloy such as a boron steel alloy or a high-strength low-alloy (HSLA) steel. Some materials, while strong for their weight, often require heat treating processes to attain the high-strength properties and/or can only be formed at high temperatures. The coating material layer 18 may be selected to help prevent oxidation during heat treatment and/or forming, to be lighter in weight than the base material layer 14, and/or to interdiffuse with other layers of the sheet metal piece 12 during heat treatment. In one embodiment, the coating material layer 18 is pure aluminum (Al) or an aluminum alloy, such as an Al-silicone (Al—Si) alloy. Other possible compositions for coating material layer 18 include pure zinc and zinc alloys or compounds (e.g., where the underlying material is galvanized). Where the base material layer 14 is steel and the coating material layer 18 comprises aluminum, the intermediate material layer 16 may include iron and aluminum in the form of inter-metallic compounds such as FeAl, $FeAl_2$, $Fe_3Al$ or $Fe_2Al_5$. The intermediate material layer 16 may also include an alloy of constituents from adjacent layers.

Some exemplary material layer thicknesses range from about 0.5 mm to about 2.0 mm for the base material layer 14, from about 1 μm to about 15 μm for the intermediate layer 16, and from about 5 μm to about 100 μm for the coating material layer 18. Of course, these ranges are non-limiting, as individual layer thicknesses depend on several factors specific to the application and/or the types of materials employed. For example, the base material layer 14 can be a material other than steel, such as an aluminum alloy or some other suitable material, in which case the thickness may be outside of the above-described exemplary range. The method described herein may be used with sheet metal pieces having more or less material layers than shown in the figures. Skilled artisans will also appreciate that the figures are not necessarily to scale and that the relative thicknesses of layers 14-18 may differ from those illustrated in the drawings.

Referring again to FIG. 3, the weld notch 30 is a portion of the edge region 20 of the sheet metal piece 12 where some material has been removed or omitted from the otherwise uniform layered structure. The weld notch 30 promotes a high quality weld joint along edge 28 when the sheet metal piece is welded to another piece, and may do so via a configuration that reduces or eliminates the coating material layer 18 and/or the intermediate material layer 16 in the edge region 20 so that it does not become a part of a subsequently-formed weld joint. This is particularly useful where the coating material layer 18 includes one or more constituents that form discontinuities in or would otherwise weaken the resulting weld joint if included therein. The weld notch 30 has a notch width W and notch depth D, each being relatively constant along the length of edge 28 in this particular embodiment. The notch width W is the distance from edge 28 to the first notch surface 32, and the notch depth D is the distance from the first side 24 (i.e., the outer surface of the coating material layer 18) to the second notch surface 34. Where the weld notch 30 is square with the sheet metal piece, as shown in this particular example, the notch width W is equal to the width of the second notch surface 34 and the notch depth D is equal to the depth of the first notch surface 32. In the following discussion, the weld notch 30 on the first side 24 of the sheet metal piece is described. However, this description applies to the weld notch 30' on the opposite second side 26 of the sheet metal piece as well, when included as in FIG. 3.

The dimensions of the weld notch 30 may be related to the thickness T of the sheet metal piece, to the intended size of the weld joint to be formed at edge 28, and/or to one or more material layer thicknesses. In one embodiment, notch width W is in a range from about 0.5 to about 1.5 times the thickness T. In another embodiment, the notch width W is in a range from about 0.5 mm to about 4 mm. The notch width W may also be at least one half of the width of the intended weld joint. The notch depth D for the example shown in FIG. 3 is greater than the thickness of the coating material layer 18 and less than the combined thickness of the intermediate and coating material layers 16, 18, but this is not necessary and may differ in some of the other exemplary embodiments.

The weld notch 30 can also be described with relation to certain characteristics of the notch surfaces 32, 34. For example, in the embodiment of FIG. 3, the first notch surface 32 includes material from both the intermediate material layer 16 and the coating material layer 18. The second notch surface 34 includes material from the intermediate material layer 16 only, and the first and second notch surfaces intersect along a junction or corner 36 that is positioned or located in the intermediate material layer. Thus, in this particular example, the weld notch 30 is formed in the sheet metal piece 12 by removing the entire coating material layer 18 and a portion of the intermediate material layer 16 along edge region 20. In other examples, the weld notch may be formed by removing only a portion of the coating material layer 18, or by removing the entire coating and intermediate material layers 18, 16 and a portion of the base material layer 14. Each of the notch surfaces 32, 34 may also include striations, witness lines, or other indicators of the type of process used to remove material at the weld notch location.

Figure 5:
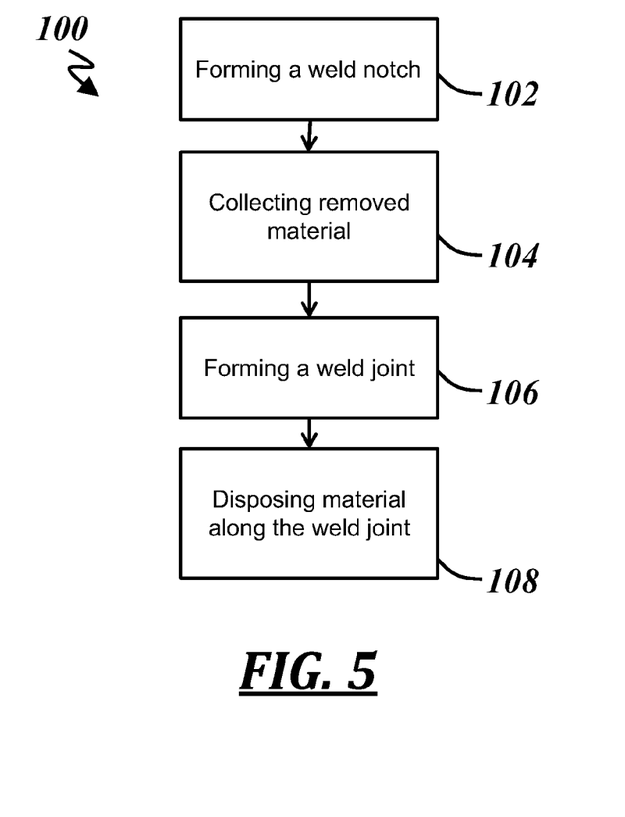
FIG. 5 is a process flow diagram illustrating a method of making a welded blank assembly.

Referring now to FIG. 5, there is shown a process flow diagram for an exemplary method 100 of making a welded blank assembly. The illustrated method includes forming a weld notch along an edge region of a coated sheet metal piece (step 102), collecting at least some of the material removed from the sheet metal piece during weld notch formation (step 104), forming a weld joint that includes material from the sheet metal piece (step 106), and subsequently disposing a capping material along the weld joint (step 108). The capping material has a composition different from that of the base material layer of the sheet metal piece and different from that of the formed weld joint, and may include the coating material layer that was previously removed. In some embodiments, material from the coating material layer may be removed from the sheet metal piece prior to forming the weld joint, and then subsequently reapplied as part of the capping material, effectively transforming the coating material from a potential weld joint contaminant to a weld joint protectant. In the following figures, the described processes are only shown with respect to the first side 24 of the sheet metal piece(s). It should be understood that each of the illustrated processes or method steps may also be performed on the opposite side of the sheet metal pieces, even though not explicitly shown in the figures.

Figure 6:
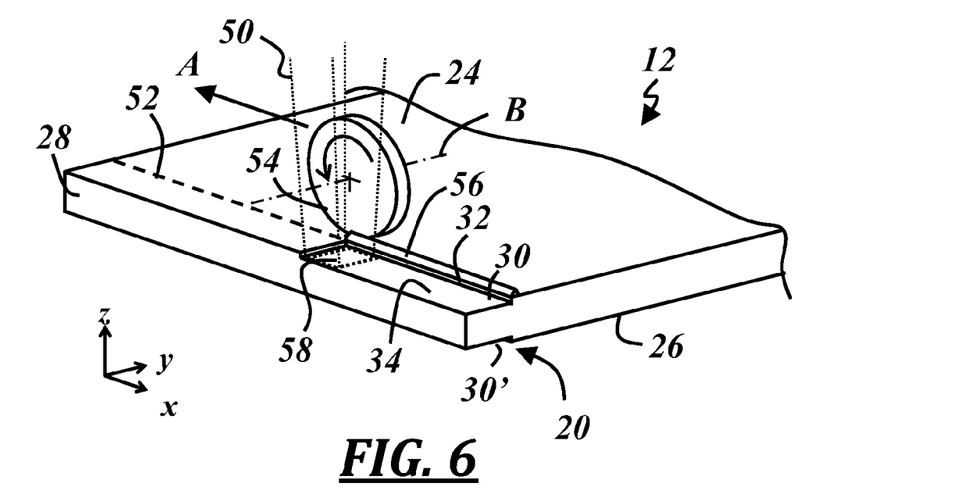
FIG. 6 is a perspective view of a sheet metal piece showing an ablation process, where the removed material is collected alongside a formed weld notch.

FIG. 6 illustrates an exemplary embodiment of the present method. In this embodiment, steps 102 and 104 of the method are performed together. In particular, the weld notch 30 is formed by a laser ablation process, in which a laser beam 50 is directed at the edge region 20 of the sheet metal piece 12 along an ablation path 52. A collection tool 54 may follow the laser beam along the ablation path and facilitates the deposition of a bead or ridge 56 of removed material alongside the ablation path 52. In this example, the laser beam 50 and the sheet metal piece 12 move relative to one another, with the sheet metal piece stationary and the laser beam moving in the direction of arrow A (along the x-axis). In this example, the collection tool 54 is in the form of a disc that rotates about an axis B and rolls alongside the laser beam along the surface of the sheet metal piece 12 to act as a shield or backstop for the removed material. However, the collection tool could be any shape and/or non-rotating, such as a tool that slides along the sheet metal piece surface or a stationary tool that extends across the sheet metal piece in the direction of the ablation path 52, so long as it collects, captures and/or otherwise gathers molten material that has been removed from the ablation path.

Laser ablation arrangements other than the specific example shown in FIG. 6 are possible, and may include movement of the sheet metal piece, a different direction of relative movement, different component orientation (e.g., a vertically-oriented sheet metal piece), a non-linear ablation path, a non-orthogonal angle of laser beam incidence, or the use of multiple laser beams, to name a few variations. An ablation site or laser spot 58 is defined where the laser beam 50 impinges the sheet metal piece 12. Light energy from the laser beam is converted to thermal energy at the laser spot 58, and the outermost portion of the sheet metal piece at the laser spot is removed by vaporization and/or liquefication of the solid material. Where configured as a coated sheet metal piece as described above, the removed material includes at least some of the coating material layer 18 and optionally some of the intermediate and base material layers 16, 14. In this example, the laser spot 58 is generally rectangular due to the rectangular cross-section of the laser beam 50, but other shapes (e.g., round, elliptical or composite shapes) are possible.

Figure 7:
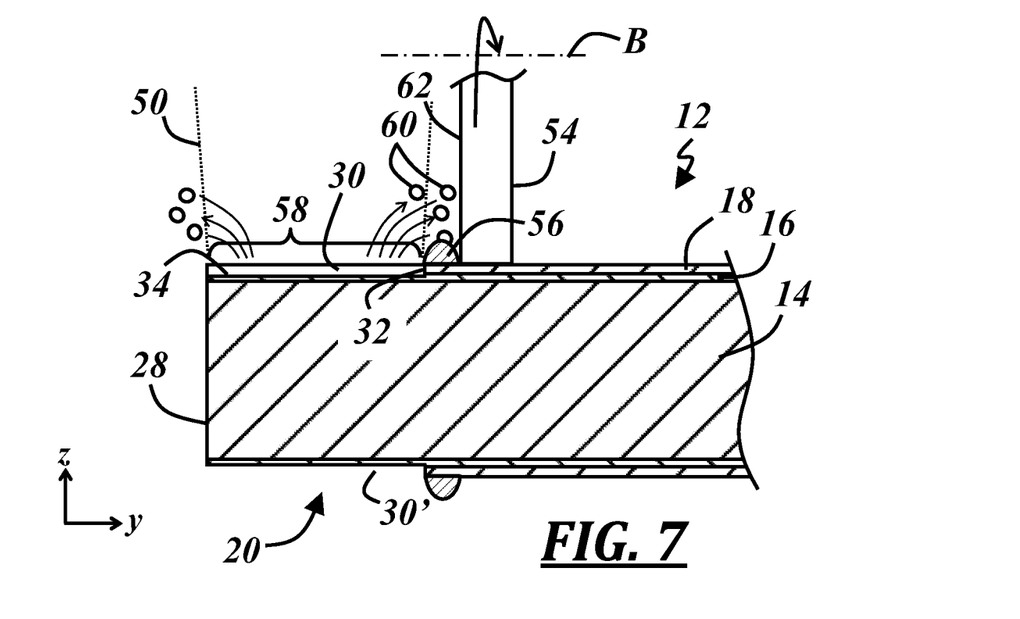
FIG. 7 is a cross-sectional view of the sheet metal piece of FIG. 6.

Referring now to FIG. 7, there is shown a cross-sectional view of the process illustrated in FIG. 6. The collection tool 54 is arranged alongside the laser spot 58 and functions as a shield of sorts to alter the normal trajectory of expulsed material 60 that may be ejected from the ablation site. For example, in some laser ablation processes, such as that shown in FIG. 7, at least some of the material removed from the sheet metal piece is expulsed from the ablation site while in a liquid or semi-liquid state. The extremely rapid local temperature changes that occur at the laser spot 58 may be accompanied by equally rapid local pressure changes, which can cause material in the fluid state to flow or otherwise be forced away from the ablation site. This may be particularly true where a pulsed laser is employed, such as high frequency nanosecond, picosecond, or femtosecond pulsed lasers. The expulsed material 60 may be in the form of droplets, as shown, that physically separate from the sheet metal piece, or it may remain in contact with the sheet metal piece and flow in a direction away from the ablation site 58. In the absence of the collection tool 54, the expulsed material may either splatter or flow or follow a trajectory to a cooler location along the sheet metal piece and farther from the ablation site, where it solidifies in some uncontrolled shape, configuration, and/or location. The collection tool 54 offers some control over these and other characteristics of the expulsed material 60. In the illustrated example, the collection tool 54 keeps the expulsed material 60 on the weld notch side 62 of the tool. The expulsed material 60 is collected at the sheet metal piece surface alongside the weld notch 30 in the form of an elongated bead or ridge 56, which comprises material from the coating material layer 18 in this example and can be subsequently reused by the method, as will be explained.

Figure 8:
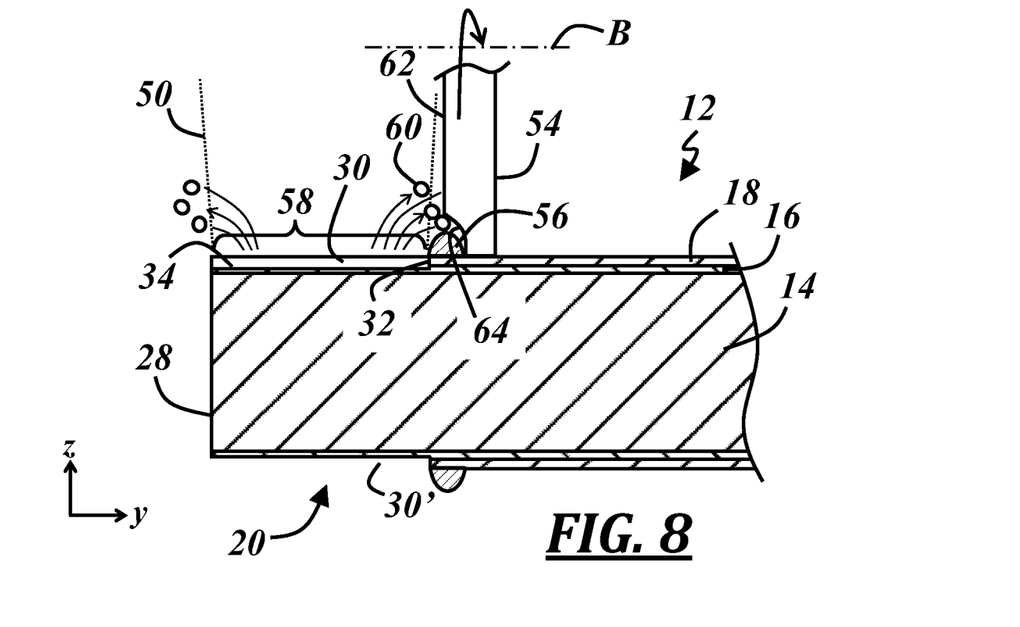
FIG. 8 is a cross-sectional view of the sheet metal piece of FIG. 6, where the collection tool includes a curved profile.

The collection tool 54 may include a profile 64 to exercise further control over the deposition of the expulsed material 60. As shown in the example of FIG. 8, the profile 64 is located on the weld notch side 62 and at the periphery of the collection tool. The illustrative profile 64 includes a curved surface that helps define the shape of the resulting bead 56 of material. The shape of the profile 64 may or may not be the same as the intended cross-sectional shape of the bead 56. For example, the profile 64 may also function to redirect expulsed material 60 toward the sheet metal piece surface—i.e., the curved shape of the illustrated profile 64 is configured to not only interrupt the normal trajectory of the expulsed material, but also to redirect it toward the sheet metal piece and the desired location of bead 56. Depending at least partly on whether the expulsed material flows along the sheet metal surface during the ablation process or loses contact with the sheet metal surface in the form of droplets as shown, not all of the material removed by the laser is necessarily deposited as part of the bead 56 of material. For example, some of the expulsed material 60 may be vaporized, some of the expulsed material may be ejected from the ablation site 58 in the direction of edge 28 and/or some of the expulsed material may stick to the collection tool 54 at a location away from the bead 56 location. In one embodiment, the collection tool is constructed from or has a surface coating comprising a non-stick material such as PTFE or other low surface energy material(s). In other embodiments, a wire brush or other cleaning tool may be used to remove excess expulsed material from the collection tool.

Figure 9:
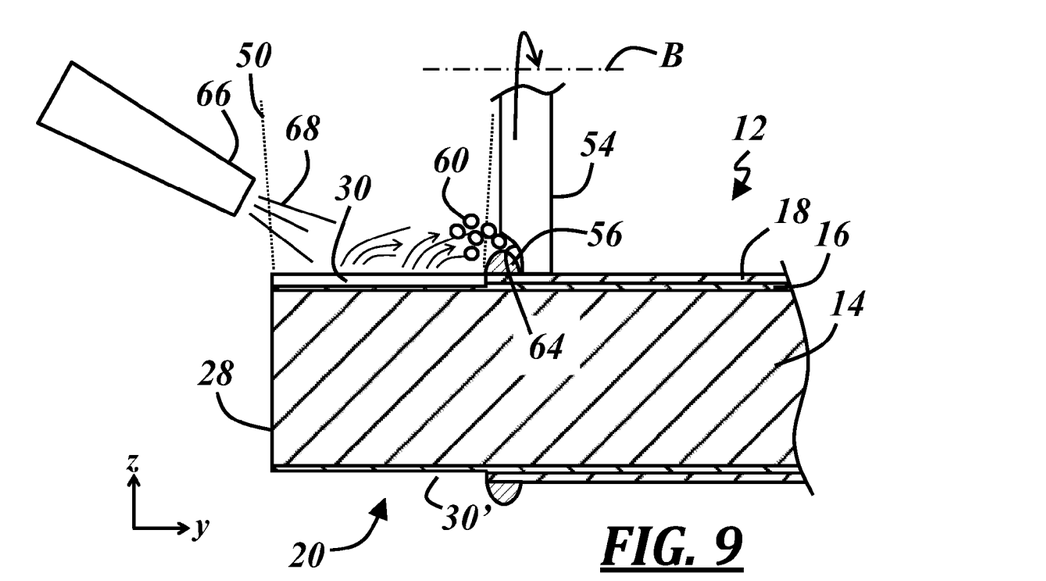
FIG. 9 is a cross-sectional view of the sheet metal piece of FIG. 6, showing a jet of gas configured to help collect the removed material.

The step of collecting removed material may also include the use of a pressurized gas, such as air, one or more shielding gases, or some other fluid, as shown in FIG. 9, for example. In this example, a gas nozzle 66 directs a jet of gas 68 at the ablation site and toward the collection tool 54 in order to influence the material expulsion process. The jet of gas 68 can simultaneously cool the newly formed weld notch and/or bead 56 of material while directing expulsed material 60 toward the collection tool and/or toward the desired bead location. As shown, more of the expulsed material 60, such as expulsed material that would otherwise be ejected from the ablation site toward edge 28, can be collected by the tool 54 and deposited along the formed weld notch 30 as part of bead 56. Of course, more than one jet 68 of gas or other fluid may be employed, and the pressure, flow rate, and direction of each jet can be customized for each application, depending on the desired shape and/or location of bead 56.

Figure 10:
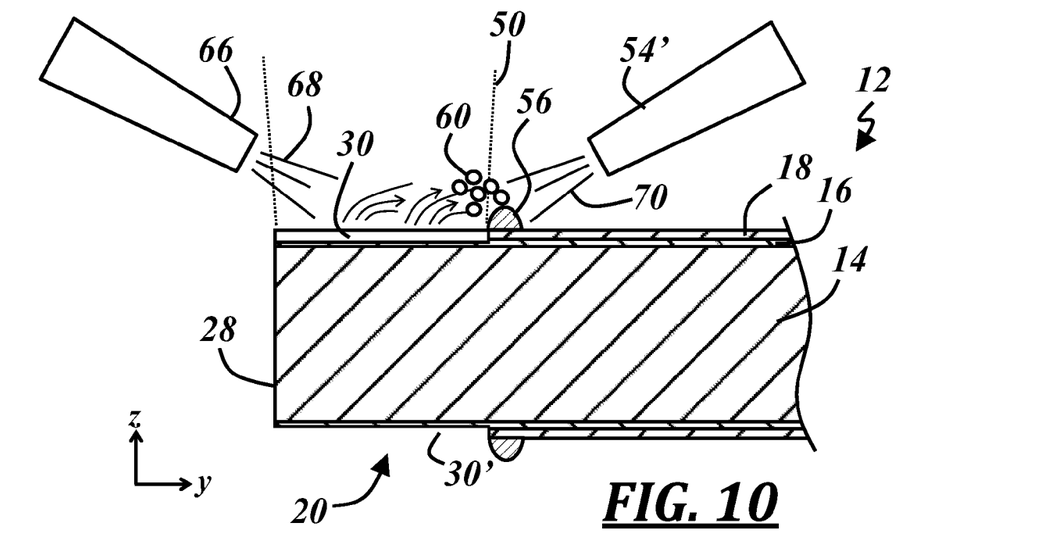
FIG. 10 is a cross-sectional view of the sheet metal piece of FIG. 6, where the collection tool includes a second jet of gas.

In the example of FIG. 10, the collection tool 54' itself is a gas nozzle or other pressurized fluid source that alters the trajectory of the expulsed material 60 without the need for a solid physical barrier. In this example, opposing jets of gases 68, 70 are used together to control the location of bead 56. Each jet of gas or other fluid 68, 70 may have independently controlled direction, pressure, velocity, flow rate, temperature, composition, profile shape (e.g., different shaped nozzle openings) and/or other parameters.

In another example, not shown, a non-rotary collection tool in the form of a shield may be used alongside the laser spot 58 in order to manipulate the normal trajectory of expulsed material and help form the resulting bead 56. The features mentioned above, like the profiled surface 64 and the pressurized air or shielding gas, may be used with this embodiment as well.

Figure 11:
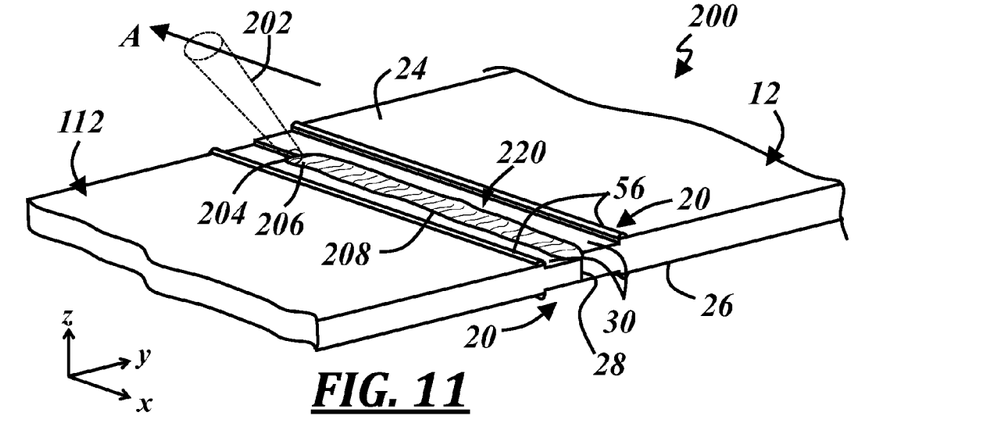
FIG. 11 is a perspective view of first and second sheet metal pieces being joined in a laser welding process to form a welded blank assembly.

With reference now to FIG. 11, there is shown an exemplary welding process for forming a welded blank assembly 200 from two coated sheet metal pieces 12, 112. One or both of the sheet metal pieces 12, 112 may include a bead 56 of material comprising coating layer material that has been removed, collected, and deposited along respective weld notches 30 in previous operations. In the illustrated process, the edge regions 20 of the two sheet metal pieces 12, 112 are aligned with respective edges 28 butted together. A high-powered laser beam 202 for welding is directed toward the aligned edge regions 20 and impinges the sheet metal pieces 12, 112 at a laser spot 204. The laser beam 202 delivers energy to the laser spot 204 that is sufficient to locally melt material from each of the sheet metal pieces 12, 112, thereby forming a weld pool 206 that includes molten material from both sheet metal pieces, preferably from both base material layers. As the laser beam 202 moves forward or advances along the aligned edge regions 20 in direction A (in the negative x-direction in FIG. 11), the portion of the weld pool 206 behind the laser beam (in the positive x-direction) solidifies to form a weld joint 208. The resulting weld joint 208 joins the two sheet metal pieces 12, 112 and is located in a weld region 220 of the welded blank assembly 200. Of course, it is possible for the two sheet metal pieces 12, 112 to move instead of or in addition to the laser beam 202, so long as there is relative movement between the work pieces and the laser.

The weld joint 208 may be substantially free of material from at least one of the coating material layer(s). This is due at least in part to the weld notches 30 being provided along the respective edge regions 20, where material from the coating layer(s) has been removed. In this particular example, each of the illustrated sheet metal pieces 12, 112 has a different thickness (i.e., assembly 200 is a tailor welded blank) and is prepared with weld notches 30 formed along opposite sides 24, 26 of the respective edge region 20. It is also noted that, although the illustrated blank assembly 200 includes a single weld joint 208, the welded blank assembly may be formed from more than two sheet metal pieces with more than one weld joint. The blank assembly 200 may alternatively or additionally include one or more curvilinear weld joints, in which at least a portion of the weld joint 208 is curve-shaped and formed along curved or contoured edges 28 and/or edge regions 20.

Figure 12:
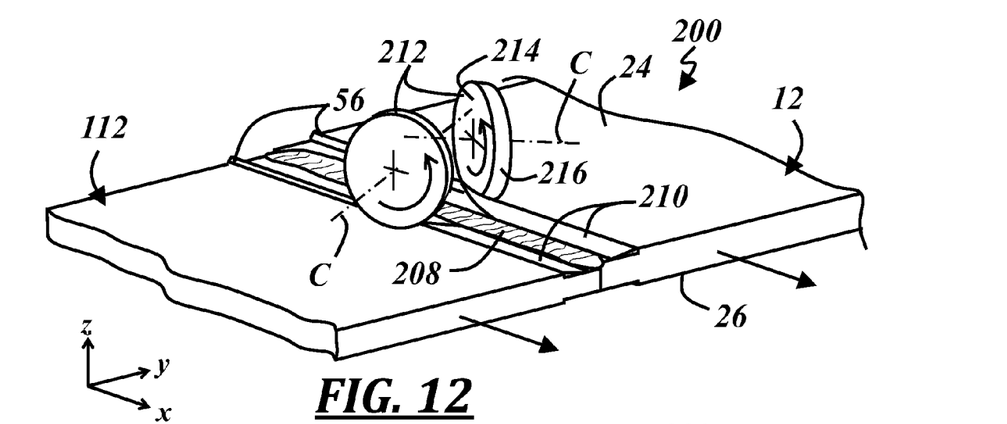
FIG. 12 is a perspective view of the welded blank assembly of FIG. 11, showing reapplication tools displacing material toward the weld joint.
Figure 13:
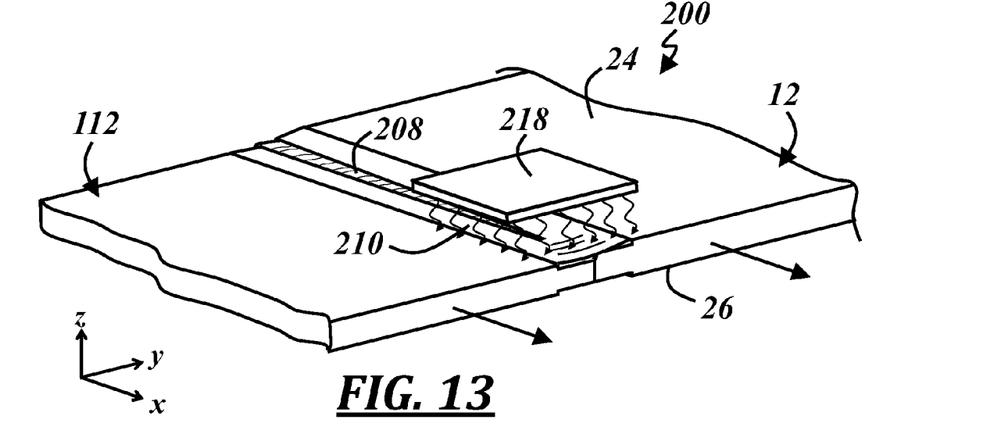
FIG. 13 is a perspective view of the welded blank assembly of FIG. 12 passing beneath a heat source.

FIGS. 12 and 13 show examples of processes, one or both of which may be included as part of step 108 of FIG. 5 to dispose a capping material 210 along or over the weld joint 208. In these examples, the expulsed material that was collected at beads 56 is now being reheated and used as capping material 210 to at least partially cover and protect the weld joint from oxidation, corrosion, etc. With reference to FIG. 12, there is shown welded blank assembly 200 in contact with a pair of reapplication tools 212 configured to displace the beads 56 of material toward the weld joint 208. The reapplication tools 212 in this example are rollers, but they could be non-rotary shields or any other suitable tool capable of redirecting or disposing the previously collected coating material towards the weld joint. Each roller has a rotational axis C, and in the illustrated example, the rollers 212 are oriented so that the rotational axes are non-perpendicular with the direction of relative movement of the blank assembly 200 and the rollers. The weld joint side 214 and/or the periphery 216 of each roller displaces material from the beads 56 toward the weld joint 208 as shown. In this example the rollers 212 remain in one place while the blank assembly 200 is moved beneath them in the direction of the unnumbered arrows, but the blank assembly could remain stationary with the rollers moving instead or there could be a series of rollers that progressively work together to displace the material. The blank assembly may be supported by additional rollers or other means (not shown) at its opposite side 26. This is only one example of a process for disposing the capping material 210 along or over the weld joint 208. In other embodiments, the reapplication tool(s) may include a stationary block having a continuously decreasing amount of space between the block and the blank assembly as the blank assembly passes beneath the block, thereby compressing the beads 56 of material and displacing the material toward the weld joint.

Depending on the dimensions of the weld notches 30, the amount of collected material present in beads 56, and other factors, the capping material 210 may partially cover the weld joint 208, entirely cover the weld joint, or be disposed alongside the weld joint without covering any portion thereof. In the example of FIG. 12, the reapplication tools 212 displace the beads 56 so that the capping material 210 covers or overlies the widthwise edges of the weld joint 208. In another embodiment, capping material may be coated over or along the weld joint 208 from a source other than the material beads 56. For example, capping material in powder form may be deposited along the weld joint immediately after the weld joint is formed and while the weld joint is still sufficiently hot to partly or fully liquefy the capping material so the capping material can flow and partially or fully cover the weld joint 208. Other sources of capping material are possible instead of, or in addition to, the beads 56 of material.

In one embodiment, a portion of the capping material 210 is material collected by the collection tool during the above-described coating removal process, and another portion of the capping material is additional material from a different source. The additional material can have the same composition as the coating material layer, or it can have a composition different from the coating material layer. The additional material can be provided as a molten material, a powder material, a spray-on or brush-on material, an extruded material, a film of material, or in any other suitable form. The additional material may be layered over the collected and reapplied material from the coating material layer, fill the remainder of the weld notch not filled by the reapplied material, cover the portion of the weld joint not covered by the reapplied material, or any combination thereof. In some cases the capping material may include only additionally provided material and does not include collected and reapplied material from the coating material layer. The capping material 210 may also be characterized as becoming a permanent addition to the welded blank assembly, thus distinguishing such embodiments from temporary weld joint protectants that are burned away or otherwise removed during subsequent processes such as metal forming and finishing processes. In some cases, the capping material has a material composition intended to change the weld joint composition or microstructure in subsequent processes. In one particular example, the capping material has a composition that may include aluminum, aluminum alloys, zinc, zinc alloys, organic or non-organic coatings, or any other corrosion protecting coatings, and can be designed for interdiffusion with the weld joint material during a subsequent heat treating and/or hot forming process.

With reference to FIG. 13, the blank assembly 200 of FIG. 12 is shown passing beneath a heat source 218. The heat source 218 is configured to supply sufficient thermal energy to the capping material 210 to cause it to flow and cover the weld joint 208. In this example, the heat source 218 is stationary, and the blank assembly 200 moves beneath the heat source, but other relative movement is possible. The heat source 218 may be an infrared heat source, conduction heat source, induction heat source, laser energy heat source, or any other suitable heat source. In this example, the blank assembly 200 is subjected to the heat source 218 after the beads 56 of material of FIGS. 11 and 12 are displaced along the weld joint 208. In another embodiment, the blank assembly 200 is subjected to the heat source 218 before or during the time the beads 56 of material of FIGS. 11 and 12 are displaced along the weld joint 208 and may serve to soften the beads of material to allow them to be more easily displaced or to more readily flow along and/or over the weld joint. In another embodiment, the reapplication tools 212 of FIG. 12 may be omitted and the heat source 218 is the reapplication tool, sufficiently heating the beads of material to cause the material to flow into the weld notches and along and/or over the weld joint 208 without the need for mechanical displacement of the beads 56. In yet another embodiment, the heat source 218 is the same heat source used to heat the welded blank assembly 200 to an elevated forming temperature at which the blank assembly is formed into a desired shape. For instance, in certain hot-forming processes, the blank assembly may be heated to an elevated temperature prior to forming, and the elevated temperature may be sufficient to cause the beads of material to flow along the weld joint. In another example, the heat source 218 is the same heat source used to heat the welded blank assembly to diffusion or heat-treating temperature at which the coating material layer interdiffuses with the base material layer. The blank assembly can also be oriented at an inclined angle or oriented vertically while subjected to the heat source 218 so that gravity can be used to aid material flow.

Figure 14:
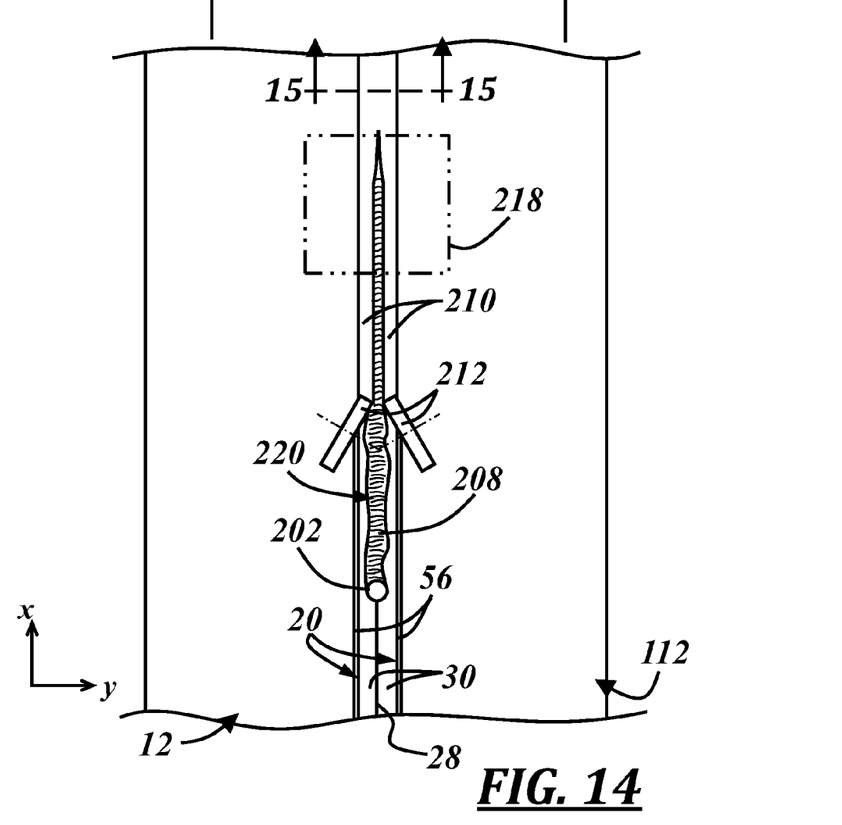
FIG. 14 is a top view of a continuous process for forming a welded blank assembly.

FIG. 14 illustrates a continuous process for making a welded blank assembly, shown in a plan view. The illustrated process corresponds to method steps 106-108 of FIG. 5. Here, two coated sheet metal pieces 12, 112 are arranged with respective edge regions 20 aligned and with edges 28 butted together. Each sheet metal piece 12, 112 includes a bead 56 of material comprising coating layer material that has been removed, collected, and deposited along the respective weld notches 30 in previous operations. The sheet metal pieces 12, 112 are fed together in the direction of the unnumbered arrows (the x-direction). In sequence, the sheet metal pieces 12, 112 are laser welded together via laser beam 202, then the beads of material 56 are displaced toward the formed weld joint 208 as the capping material 210 by reapplication tools 212 while the material is still heated and softened by the laser beam 202. Subsequently, the weld region 220 passes beneath heat source 218 to cause the capping material to flow and cover the weld joint 208. This is only one example of a continuous process, as one or more steps may be omitted or additional steps may be added. For example, heat sources 218 may be arranged before, after and concurrent with the reapplication tools 212, capping material 210 may be supplied from an alternative or additional source from the material beads 56, etc.

Figure 15:
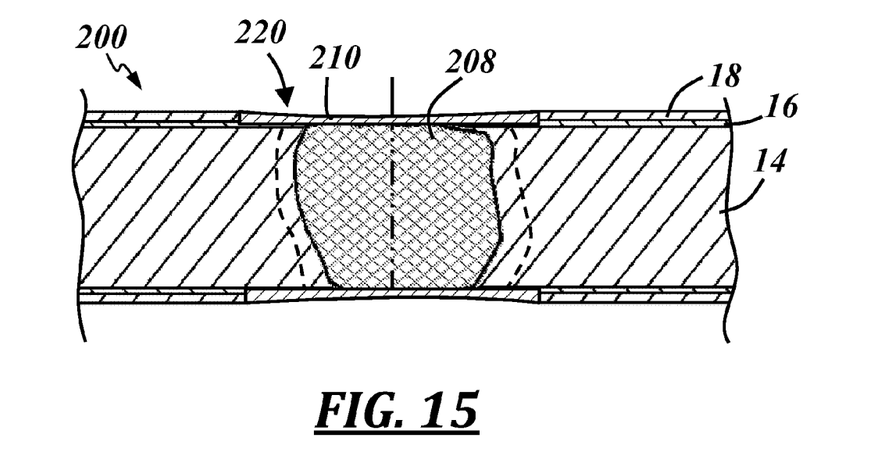
FIG. 15 is a cross-sectional view of the welded blank assembly of FIG. 14.

FIG. 15 is a cross-sectional view of an exemplary weld region 220 of the welded blank assembly 200 after the capping material 210 is disposed over the weld joint 208. The capping material 210 covers and/or protects the base material layer or intermediate material layer otherwise exposed by formation of the weld notches, as well as covering and/or protecting the weld joint 208, which is largely composed of the base material layer. In this example, the sheet metal pieces that are joined to form the blank assembly 200 have the same thickness, but the joined pieces may have different thicknesses as well, as in FIGS. 11-13.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A welded blank assembly, comprising:
   first and second sheet metal pieces, at least one of the sheet metal pieces having a base material layer with a thickness from 0.5 mm to 2.0 mm, a coating material layer formed on opposite sides of the base material layer with a thickness from 5 μm to 100 μm, an intermediate material layer formed on opposite sides of the base material layer between the base material layer and the coating material layer, and an edge region with separate weld notches, where at least a portion of both the coating material layer and the intermediate material layer have been removed at the weld notches on each side of the opposite sides of the base material layer;
   a weld joint joining the first and second sheet metal pieces together at the edge region, the weld joint includes material from the base material layer but is substantially free of material from the coating material layer and the intermediate material layer; and
   capping material filling at least a portion of at least one of the weld notches, wherein the capping material is in direct contact with the weld joint and becomes a permanent addition to the welded blank assembly.

2. The welded blank assembly of claim 1, wherein the capping material includes reapplied material from the coating material layer, the reapplied material is initially removed from at least one of the weld notches, deposited alongside at least one of the weld notches, and is then displaced towards the weld joint so that it refills at least a portion of at least one of the weld notches.

3. The welded blank assembly of claim 1, wherein the capping material includes additional material with a different material composition than that of the coating material layer.

4. The welded blank assembly of claim 3, wherein the additional material has a composition that includes aluminum or an aluminum alloy.

5. The welded blank assembly of claim 1, wherein the capping material fills at least a portion of at least one of the weld notches so that the capping material is in direct contact with both the base material layer and the weld joint.

6. The welded blank assembly of claim 1, wherein the weld joint is located in a weld region of the welded blank assembly, and the capping material covers the weld region so that neither the weld joint nor the base material layer is exposed along at least a portion of the length of the weld region.

7. A welded blank assembly, comprising:
   first and second sheet metal pieces joined together, at least one of the sheet metal pieces having a base material layer, a coating material layer formed on opposite sides of the base material layer, and an edge region with separate weld notches formed on opposite top and bottom sides of the sheet metal piece, wherein at least a portion of the coating material layer has been removed at the weld notches on each side of the opposite top and bottom sides of the sheet metal piece so as to at least partially expose the base material layer;
   a weld joint joining the first and second sheet metal pieces together along a weld region, the weld joint includes material from the base material layer but is substantially free of material from the coating material layer; and
   capping material overlying at least a portion of the weld joint, wherein the capping material includes material that was removed from the coating material layer before formation of the weld joint and was reapplied over the partially exposed base material layer and the weld joint after formation of the weld joint.

8. The welded blank assembly of claim 7, wherein the at least one sheet metal piece includes the separate weld notches in the edge region where at least a portion of the coating material layer has been removed, and the capping material fills in at least a portion of at least one of the weld notches.

9. The welded blank assembly of claim 7, wherein the capping material includes additional material with a different material composition than that of the coating material layer.

10. The welded blank assembly of claim 9, wherein the additional material has a composition that includes aluminum or an aluminum alloy.

11. The welded blank assembly of claim 7, wherein the capping material fills at least a portion of at least one of the weld notches so that the capping material is in direct contact with both the base material layer and the weld joint.

12. A method of making a welded blank assembly, comprising the steps of:

(a) removing and collecting coating material and intermediate material from a region of a coated sheet metal piece so as to at least partially expose a base material, the coated sheet metal piece comprising a base material layer, a coating material layer formed on opposite sides of the base material layer, and an intermediate material layer formed on opposite sides of the base material layer between the base material layer and the coating material layer;

(b) welding the sheet metal piece to another sheet metal piece so that a weld joint is formed in the region of the coated sheet metal piece, the weld joint includes base material from the base material layer of the sheet metal pieces but is substantially free of coating material from the coating material layer and intermediate material from the intermediate material layer; and (c) applying capping material to the region of the coated sheet metal piece so that it covers at least a portion of the weld joint formed in step (b) and covers at least a portion of the base material at least partially exposed in step (a), wherein the applied capping material includes at least a portion of the coating material that was removed and collected in step (a).

13. The method of claim 12, wherein step (a) further comprises removing coating material with a laser ablation process that uses thermal energy from a laser beam to remove coating material from the region of the coated sheet metal piece.

14. The method of claim 13, wherein step (a) further comprises collecting removed coating material with a collection tool, a portion of the removed coating material is expulsed from the coated sheet metal piece during the laser ablation process and is collected by the collection tool.

15. The method of claim 14, wherein step (a) further comprises depositing collected coating material with the collection tool, a portion of the collected coating material is deposited alongside the region of the coated sheet metal piece in the form of a bead so that it can be subsequently reapplied in step (c).

16. The method of claim 14, wherein the collection tool includes a shield that is located adjacent the region of the coated sheet metal piece and has a profile configured to interrupt a normal trajectory of the expulsed material.

17. The method of claim 14, wherein the collection tool includes a gas nozzle that is located adjacent the region of the coated sheet metal piece and directs pressurized gas to guide the expulsed material to a desired location.

18. The method of claim 12, wherein step (b) further comprises welding the sheet metal piece to another sheet metal piece with a laser welding process that uses thermal energy from a laser beam to form the weld joint.

19. The method of claim 12, wherein step (c) further comprises applying capping material with a reapplication tool, the capping material includes previously removed coating material deposited alongside the region of the coated sheet metal piece and the reapplication tool displaces the previously removed coating material towards the weld joint.

20. The method of claim 12, wherein step (c) further comprises applying capping material with an application tool, the capping material includes additional material from a source other than the coating material and the application tool introduces the additional material to the region of the coated sheet metal piece so that it covers at least a portion of the weld joint.

21. The method of claim 20, wherein the additional material has a composition that includes aluminum or an aluminum alloy and becomes a permanent addition to the welded blank assembly.

22. The method of claim 12, wherein step (c) further comprises providing heat as the capping material is applied to the region of the sheet metal piece, the provided heat causes the capping material to at least partially melt and flow to the region of the sheet metal piece so that it covers at least a portion of the weld joint.

23. The method of claim 12, wherein step (c) further comprises applying capping material to the region of the sheet metal sheet and covering the weld joint so that neither the weld joint nor a base material layer of the sheet metal piece is exposed.

24. The method of claim 12, wherein step (c) further comprises applying capping material with the same material composition as the coating material to the region of the sheet metal piece so that it covers the weld joint, a coating material layer with a uniform material composition extends from the coated sheet metal piece across the weld joint.

* * * * *

UNITED STATES PATENT AND TRADEMARK OFFICE
CERTIFICATE OF CORRECTION

PATENT NO. : 9,956,636 B2
APPLICATION NO. : 14/211924
DATED : May 1, 2018
INVENTOR(S) : James J. Evangelista Page 1 of 1

It is certified that error appears in the above-identified patent and that said Letters Patent is hereby corrected as shown below:

In the Claims

Claim 23, Column 14, Line 34, replace "sheet metal sheet" with ""sheet metal piece"

Signed and Sealed this
Ninth Day of October, 2018

Andrei Iancu
*Director of the United States Patent and Trademark Office*